(12) United States Patent
Dolog et al.

(10) Patent No.: US 11,927,069 B2
(45) Date of Patent: Mar. 12, 2024

(54) DOWNHOLE TOOLS CONTAINING DUCTILE CEMENTING MATERIALS

(71) Applicant: Baker Hughes Holdings LLC, Houston, TX (US)

(72) Inventors: Rostyslav Dolog, Houston, TX (US); Oleg A. Mazyar, Katy, TX (US); Juan Carlos Flores Perez, The Woodlands, TX (US); Valery N. Khabashesku, Houston, TX (US)

(73) Assignee: BAKER HUGHES HOLDINGS LLC, Houston, TX (US)

( * ) Notice: Subject to any disclaimer, the term of this patent is extended or adjusted under 35 U.S.C. 154(b) by 0 days.

(21) Appl. No.: 17/961,107

(22) Filed: Oct. 6, 2022

(65) Prior Publication Data

US 2023/0094136 A1   Mar. 30, 2023

Related U.S. Application Data

(63) Continuation of application No. 15/262,643, filed on Sep. 12, 2016, now Pat. No. 11,492,866.

(51) Int. Cl.
| | |
|---|---|
| *E21B 33/12* | (2006.01) |
| *C04B 28/04* | (2006.01) |
| *C04B 28/06* | (2006.01) |
| *C04B 28/14* | (2006.01) |
| *C04B 28/18* | (2006.01) |

(52) U.S. Cl.
CPC .............. *E21B 33/12* (2013.01); *C04B 28/04* (2013.01); *C04B 28/06* (2013.01); *C04B 28/14* (2013.01); *C04B 28/18* (2013.01)

(58) Field of Classification Search
None
See application file for complete search history.

(56) References Cited

U.S. PATENT DOCUMENTS

| | | |
|---|---|---|
| 2,555,627 A | 6/1951 | Baker |
| 5,094,769 A | 3/1992 | Anderson, Jr. et al. |
| 5,307,876 A | 5/1994 | Cowan et al. |
| 6,230,804 B1 | 5/2001 | Mueller et al. |
| 6,394,180 B1 | 5/2002 | Berscheidt et al. |

(Continued)

OTHER PUBLICATIONS

"Material Property Characterization of Ultra-High Performance Concrete", U.S. Department of Transportation Federal Highway Administration, Research, Development, and Technology, Turner-Fairbank Highway Research Center, McLean, VA, Aug. 2006; 188 pages.

(Continued)

*Primary Examiner* — Charles R Nold
(74) *Attorney, Agent, or Firm* — CANTOR COLBURN LLP

(57) ABSTRACT

A downhole tool for controlling the flow of a fluid in a wellbore includes a component that comprises: a cementitious material; an aggregate; and a ductility modifying agent comprising one or more of the following: an ionomer; a functionalized filler; the functionalized filler comprising one or more of the following: functionalized carbon; functionalized clay; functionalized silica; functionalized alumina; functionalized zirconia; functionalized titanium dioxide; functionalized silsesquioxane; functionalized halloysite; or functionalized boron nitride; a metallic fiber; or a polymeric fiber.

17 Claims, 3 Drawing Sheets

(56) References Cited

U.S. PATENT DOCUMENTS

| | | | |
|---|---|---|---|
| 6,491,116 | B2 | 12/2002 | Berscheidt et al. |
| 7,036,586 | B2 | 5/2006 | Roddy et al. |
| 7,740,079 | B2 | 6/2010 | Clayton et al. |
| 8,496,052 | B2 | 7/2013 | Frazier |
| 8,592,353 | B2 | 11/2013 | Dalrymple et al. |
| 2005/0161212 | A1 | 7/2005 | Leismer et al. |
| 2007/0207335 | A1 | 9/2007 | Karandikar et al. |
| 2008/0103065 | A1 | 5/2008 | Reddy et al. |
| 2008/0251006 | A1 | 10/2008 | Didenko et al. |
| 2008/0271898 | A1 | 11/2008 | Turley et al. |
| 2009/0018240 | A1 | 1/2009 | Becker et al. |
| 2010/0290999 | A1 | 11/2010 | Kim et al. |
| 2011/0048740 | A1 | 3/2011 | Ward et al. |
| 2011/0086942 | A1 | 4/2011 | Robisson et al. |
| 2011/0127464 | A1 | 6/2011 | Zinn et al. |
| 2011/0240295 | A1 | 10/2011 | Porter et al. |
| 2011/0315403 | A1 | 12/2011 | Nard et al. |
| 2013/0096038 | A1* | 4/2013 | Kim .................. C08L 23/16 507/221 |
| 2013/0139727 | A1 | 6/2013 | Constantz et al. |
| 2013/0277044 | A1 | 10/2013 | King et al. |
| 2014/0011903 | A1 | 1/2014 | Bosynak et al. |
| 2015/0102265 | A1 | 4/2015 | Russell et al. |
| 2016/0160611 | A1 | 6/2016 | Zhang et al. |
| 2016/0258269 | A1 | 9/2016 | Musso et al. |
| 2017/0015896 | A1 | 1/2017 | Cox et al. |
| 2018/0044570 | A1 | 2/2018 | Fernandez et al. |

OTHER PUBLICATIONS

"Material Safety Data Sheet", Ductal Premix, Lafarge North America Inc., Mar. 1, 2011; 6 pages.

"Ultra High Performance Concrete," NPCA White Paper, Guide to Manufacturing Architectural Precast UHPC Elements, National Precast Concrete Association; 19 pages.

"Ultra-High Performance Concrete: A State-of-the-Art Report for the Bridge Community", Publication No. FHWA-HIRT-13-060, U.S. Department of Transportation, Federal Highway Administration, Research, Development, and Technology, Jun. 2013; 176 pages.

Abbas, et al. "Ultra-High Performance Concrete: Mechanical Performance, Durability, Sustainability and Implementation Challenges", International Journal of Concrete Structures and Materials, vol. 10, No. 3, Sep. 2016; pp. 271-295.

Adams, et al. "Preparation and characterization of sulfonic acid-functionalized single-walled carbon nanotubes", Physica E41 (2009) 723-728.

Cwirzen, et al. "Surface decoration of carbon nanotubes and mechanical properties of cement/carbon nanotube composites", Advances in Cement Research, 2008, 20, No. 2, April; pp. 65-73.

Dugat, et al. "Mechanical properties of reactive powder concretes", Materials and Structures/MaMriaux et Constructions, vol. 29, May 1996; pp. 233-240.

Eisenbeisz, Hadley G. "South Dakota's First HPC Bridge", South Dakota Department of Transportation, Birdge Views Issue No. 16, Jul./Aug. 2001; 6 pages.

Heinz et al. "Effect of Heat Treatment Method on the Properties of UHPC", Ultra-High Performance Concrete and Nanotechnology in Construction, Proceedings of Hipermat, 3rd International Symposium on UHPC and Nanotechnology for High Performance Construction Materials, Kassel, Mar. 7-9, 2012 11 pages.

International Search Report, International Application No. PCT/US2017/046278, Korean Intellectual Property Office; International Search Report 3 pages.

International Written Opinion, International Application No. PCT/US2017/046278, Korean Intellectual Property Office; International Written Opinion 12 pages.

Kim, Yail J. "Recent Advances in Ultra-high Performance Concrete", Department of Civil Engineering, University of Colorado Denver, Dec. 8, 2013; 10 pages.

Kushartomo, et al. "Mechanical behavior of reactive powder concrete with glass powder substitute", The 5th International Conference of Euro Asia Civil Engineering Forum, Procedia Engineering 125 ( 2015 ) 617-622.

Kusumawardaningsih, et al. "UHPC compressive strength test specimens: Cylinder or cube?", The 5th International Conference of Euro Asia Civil Engineering Forum, Procedia Engineering 125 ( 2015 ) 1076-1080.

Li, Victor C. "Engineered Cementitious Composites (ECC)—Material, Structural and Durability Performance", University of Michigan, Aug. 30, 2007, Chapter 24, pp. 1-78.

Lubbers, Anna R. "Bond Performance Between Ultra-High Performance Concrete and Prestressing Strands", A Thesis Presented to the Faculty of the College of Engineering and Technology of Ohio University, Aug. 2003; 155 pages.

Lucero, Catherine "Ultra-High Performance Concrete Used as a Coating" Research and Development Office Science and Technology Program (Interim Report), Sep. 2015; 11 pages.

Luo, et al. "Nanofluid of graphene-based amphiphilic Janus nanosheets for tertiary or enhanced oil recovery: High performance at low concentration", PNAS Early Edition, May 25, 2016; 6 pages.

Munoz, Miguel Angel Carbonell "Compatibility of ultra high performance concrete as repair material : bond characterization with concrete under different loading scenarios", Thesis Paper, Michigan Technological University, 2012; 168 pages.

Musso, et al., "Stimuli-Responsive Cement-Reinforced Rubber", Department of Civil and Enviornmental Engineering, Massachussetts Institute of Technology, Apr. 15, 2014; 7 pages.

Nematollahi, et al. "A review on ultra high performance 'ductile' concrete (UHPdC) technology", International Journal of Civil and Structural Engineering, vol. 2, No. 3, 2012; 16 pages.

Pyo, Sukhoon "Characteristics of Ultra High Performance Concrete Subjected to Dynamic Loading", A dissertation submitted in partial fulfillment of the requirements for the degree of Doctor of Philosophy (Civil Engineering) in the University of Michigan, 2014; 208 pages.

Raki, Laila, et al. "Cement and Concrete Nanoscience and Nanotechnology", Materials 2010, 3, 918-942 (25 pp.).

Richard, et al. "Reactive Powder Concretes with High Ductility and 200-800 MPa Compressive Strength", Concrete Technology, vol. 14, Mar. 1, 1994; 12 pages.

Sherman, Nicole "Ductal ®, a new Ultra High Performance Concrete", Fineconcrete , Oct. 21, 2015; 3 pages.

Shi, et al. "A review on ultra high performance concrete: Part I. Raw materials and mixture design", Construction and Building Materials, College of Civil Engineering, Hunan University, Changsha 410082, PR China, Dec. 2015; 12 bages.

Shi, et al. "High Temperature Shape Memory Polymers", Macromolecules, American Chemical Society, 2013; 8 pages.

Sobolev, Konstantin, et al. "Nanomaterials and Nanotechnology for High-Performance Cement Composites", Proceedings of ACI Session on "Nanotechnology of Concrete: Recent Developments and Future Perspectives"Nov. 7, 2006, Denver, USA.

Tohver, et al. "Nanoparticle halos: A new colloid stabilization mechanism", University of California, vol. 98, No. 16, Jul. 31, 2001; 5 pages.

Vaitkevičius, et al. "Influence of Silica Fume on Ultrahigh Performance", World Academy of Science, Engineering and Technology, International Journal of Civil, Environmental, Structural, Construction and Architectural Engineering vol. 8, No. 1, 2014; 6 pages.

Van Thu Le, et al. "Surface modification and functionalization of carbon nanotube with some organic compounds", Advances in Natural Sciences: Nanoscience and Nanotechnology, 4 (2013) 035017 (5pp).

Wang, et al. "A review on ultra high performance concrete: Part II. Hydration, microstructure and properties", Construction and Building Materials 96 (2015) 368-377.

Wu, et al. "Janus graphene oxide nanosheets prepared via Pickering emulsion template", Carbon 93 (2015) 473-483.

* cited by examiner

DOWNHOLE TOOLS CONTAINING DUCTILE CEMENTING MATERIALS

CROSS REFERENCE TO RELATED APPLICATIONS

This application is a continuation of U.S. application Ser. No. 15/262,643 filed Sep. 12, 2016, the disclosure of which is incorporated by reference herein in its entirety.

BACKGROUND

Frac plugs are commonly used downhole tools. Frac plugs can isolate zones in a well, allowing pressurized fluids to treat the target zone or isolated portion of a formation. In operation, forces apply to components of a frac plug and urge a seal member to deform and fill a space between the plug and a casing. The setting load can be as high as 60,000 lbf. Upon setting, the plug can also be subjected to high or extreme pressure conditions. Accordingly, plugs includes various components thereof must be capable of withstanding high pressures or forces during the setting and subsequent fracturing operations. To increase the compressive strength of plug components, filament winding or filler orientation techniques have been used. However, the cost may be less than desirable due to machining procedures and the materials used. There is a continuing need in the art for tools or components of tools that have high compressive strength and are cost effective. It would be a further advantage if such tools or components can be readily made.

BRIEF DESCRIPTION

A component for a downhole tool comprises: a cementitious material; an aggregate; and a ductility modifying agent comprising one or more of the following: an ionomer; a functionalized filler; the functionalized filler comprising one or more of the following: functionalized carbon; functionalized clay; functionalized silica; functionalized alumina; functionalized zirconia; functionalized titanium dioxide; functionalized silsesquioxane; functionalized halloysite; or functionalized boron nitride; a metallic fiber; or a polymeric fiber.

Also disclosed is a downhole tool comprising the component. In an embodiment, A downhole tool for controlling the flow of a fluid in a wellbore comprises an annular body having a flow passage therethrough; a frustoconical member disposed about the annular body; a seal member carried on the annular body and configured to engage a portion of the frustoconical member; and a bottom sub disposed about the annular body; wherein at least one of the frustoconical member and the bottom sub comprise: a cementitious material; an aggregate; and a ductility modifying agent comprising one or more of the following: an ionomer; a functionalized filler; the functionalized filler comprising one or more of the following: functionalized carbon; functionalized clay; functionalized silica; functionalized alumina; functionalized zirconia; functionalized titanium dioxide; functionalized silsesquioxane; functionalized halloysite; or functionalized boron nitride; a metallic fiber; or a polymeric fiber.

BRIEF DESCRIPTION OF THE DRAWINGS

The following description should not be considered limiting in any way. With reference to the accompanying drawings, like elements are numbered alike.

DETAILED DESCRIPTION

Figure 1:
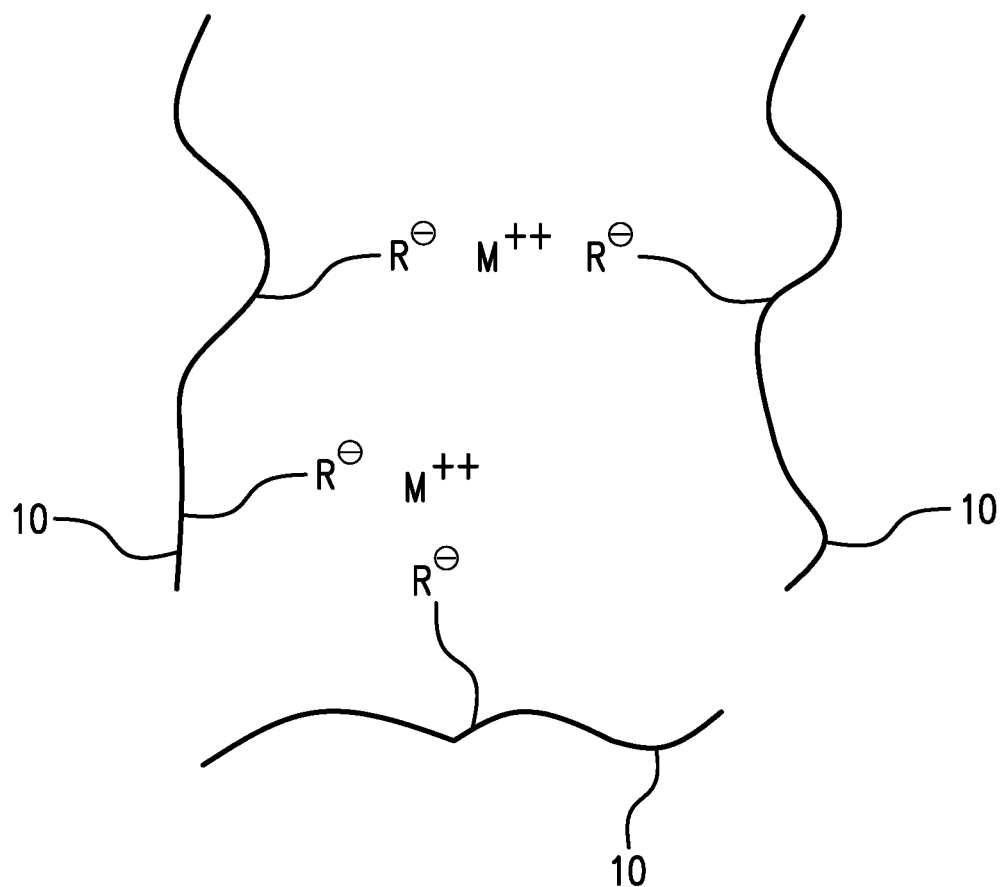
FIG. 1 illustrates the crosslinking between ionomers in a cementing composition according to an embodiment of the disclosure.

The inventors have discovered that components having improved strength and ductility at the same time can be made from cementing compositions comprising a ductility modifying agent such as an ionomer; functionalized filler; a metallic fiber; a polymeric fiber; or a combination thereof. In addition to the ductility modifying agent, the cementing composition can also contain a cementitious material and an aggregate. Advantageously, the components can be used in tools such as frac plugs and bridge plugs to control fluid flow. More than one component can include the cementing compositions.

As used herein, ionomers are polymers that comprise ionic groups bonded to a neutral polymer backbone. The ionomers can be a homopolymer or a copolymer derived from two or more different monomers. Suitable ionic groups include a sulfonate group, a phosphonate group, a carboxylate group, a carboxyl group, a sulfonic acid group, or a phosphonic acid group. Combinations of the ionic groups can be used. The ionomers can have an ionic group content of about 0.5 mol % to about 20 mol % or about 3 mol % to about 10 mole % based on the total weight of the ionomers.

Ionomers can be prepared by introducing acid groups to a polymer backbone. If needed, the acid groups can be at least partially neutralized by a metal cation such as sodium, potassium, calcium, or zinc. In some embodiments, the groups introduced are already neutralized by a metal cation. The introduction of acid groups can be accomplished in at least two ways. In a first method, a neutral non-ionic monomer can be copolymerized with a monomer that is effective to provide pendant acid groups. Alternatively, acid groups can be added to a non-ionic polymer through post-reaction modifications.

Monomers that can provide acid groups include an acid anhydride based monomer, an ethylenically unsaturated sulfonic acid, an ethylenically unsaturated phosphoric acid, an ethylenically unsaturated carboxylic acid, a monoester of an ethylenically unsaturated dicarboxylic acid, or a combination comprising at least one of the foregoing. Specific examples of the monomers that can provide acid groups include maleic acid anhydride, vinyl sulfonic acid, vinyl phosphoric acid, acrylic acid, methacrylic acid, ethacrylic acid, itaconic acid, maleic acid, fumaric acid, methyl hydrogen maleate, methyl hydrogen fumarate, and ethyl hydrogen fumarate. The aid groups can be non-neutralized, partially, or completely neutralized with a metal ion such as sodium ions, potassium ions, zinc ions, magnesium ions, calcium ions, or aluminum ions. Ionomers can be derived from one or more monomers that can provide acid groups. Neutral non-ionic monomers can optionally be used together with acid group-containing monomers to make the ionomers. Neutral non-ionic monomers include olefins such as ethylene, propylene, butylene, butadiene, and styrene; vinyl acetate; and (meth) acrylates.

Ionic groups can also be grafted to a polymer backbone. For example, maleation is a type of grafting wherein maleic anhydride, acrylic acid derivatives or combinations thereof are grafted onto the backbone chain of a graftable polymer. In an embodiment, the graftable polymer is a polyolefin selected from polypropylene, polyethylene, or a combination thereof.

A large number of ionomers could be used in the cementing composition, including but are not limited to: carboxylated polyolefins, sulfonated fluorinated polyolefins, sulfonated ethylene-propylene-diene (EPDM), sulfonated polystyrene, phosphonated polyolefins, and the like. Exemplary carboxylated polyolefins include ethylene acrylic acid copolymer, an ethylene methacrylic acid copolymer, and an ethylene-acrylic acid-methacrylic acid ternary copolymer. Ethylene methacrylic acid copolymers (E/MAA) are commercially available as SURLYN from DuPont or LOTEK from ExxonMobil. Exemplary sulfonated fluorinated polyolefins include sulfonated tetrafluoroethylene based fluoropolymer-copolymer such as NAFION from DuPont (CAS Number 66796-30-3).

Without wising to be bound by theory, it is believed that ionic groups can microphase separate from the non-polar part of polymer chain to form ionic clusters, which can act as physical crosslinks. In addition, ionic groups can also link to the metal cations in the cementitious material or hydrated cementitious material to produce chemical crosslinks. Exemplary metal cations include calcium ions, aluminum ions, zinc ions, magnesium ions, barium ions, or a combination comprising at least one of the foregoing. In the case of bivalent metal cations, a bridge-like crosslinks can be formed linking two ionomers together or linking an ionomer with other components in the component. FIG. 1 illustrates the crosslinking of two ionomers in the component. As shown in FIG. 1, polymer chains 10 can be crosslinked via the interaction between the ionic groups R on the ionomer and the metal cation present in the component. The incorporation of the polymer chains into a component thus can improve the ductility of the component.

Functionalized filler can also be used to improve the ductility and/or toughness of the components. Functionalized filler refers to a filler functionalized with one or more functional groups. Exemplary fillers include a carbon material, clays, silica, halloysites, polysilsequioxanes, boron nitride, alumina, zirconia, or titanium dioxide. A carbon material includes a fullerene, carbon nanotube, graphite, graphene, carbon fiber, carbon black, and nanodiamonds combinations of different filler materials can be used. The functionalized clay, functionalized halloysites, functionalized silicate, and functionalized silica can be functionalized nanoclay, functionalized nanohalloysites, functionalized nanosilicate, or functionalized nanosilica. In an exemplary embodiment, the functionalized filler includes functionalized carbon nanotubes. Carbon nanotubes are tubular fullerene structures having open or closed ends and which may be inorganic or made entirely or partially of carbon, and may include also components such as metals or metalloids. Nanotubes, including carbon nanotubes, may be single walled nanotubes (SWNTs) or multi-walled nanotubes (MWNTs).

Functional groups include a sulfonate group, a phosphonate group, a carboxylate group, a carboxyl group, a sulfonic acid group, or a phosphonic acid group, or a combination comprising at least one of the foregoing functional groups.

As used herein, "functionalized fillers" include both non-covalently functionalized fillers and covalently functionalized fillers. Non-covalent functionalization is based on van der Walls forces, hydrogen bonding, ionic interactions, dipole-dipole interactions, hydrophobic or π-π interactions. Covalent functionalization means that the functional groups are covalently bonded to the filler, either directly or via an organic moiety.

Any known methods to functionalize the fillers can be used. For example, surfactants, ionic liquids, or organometallic compounds having the functional groups comprising a sulfonate group, a phosphonate group, a carboxylate group, a carboxyl group, a sulfonic acid group, or a phosphonic acid group, or a combination comprising at least one of the foregoing can be used to non-covalently functionalize the fillers.

In an embodiment, boron nitride is non-covalently functionalized with an organometallic compound having a hydrophilic moiety and a functional group comprising a sulfonate group, a phosphonate group, a carboxylate group, a carboxyl group, a sulfonic acid group, or a phosphonic acid group, or a combination comprising at least one of the foregoing functional groups. Exemplary hydrophilic moieties include —CH$_2$CH$_2$—O—, —CH$_2$—CH(OH)—O—, and —OH.

The organometallic compound used to covalently functionalize boron nitride is a compound of the formulas (I), (II), (III), or (IV)

(formula I)
(formula II)

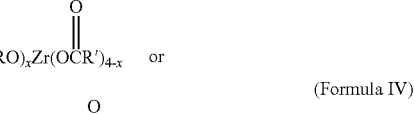
(Formula III)

(Formula IV)

In formulas (I)-(IV), R is a hydrophilic group such as a group containing an ether group, a hydroxyl group, or a combination comprising at least one of the foregoing. An exemplary R is —CH$_2$—CH$_2$—(—O—CH$_2$—CH$_2$—O)$_k$—OH, wherein k is zero to about 30. R' is a moiety containing a sulfonate group, a phosphonate group, a carboxylate group, a carboxyl group, a sulfonic acid group, or a phosphonic acid group, or a combination comprising at least one of the foregoing. R' has a structure of formula (V)-(X):

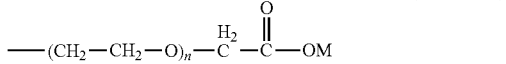
(Formula V)

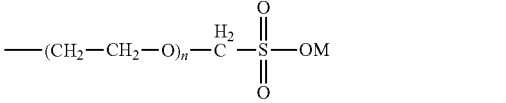
(Formula VI)

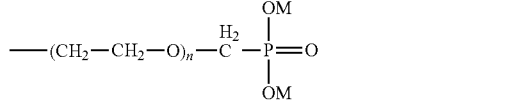
(Formula VII)

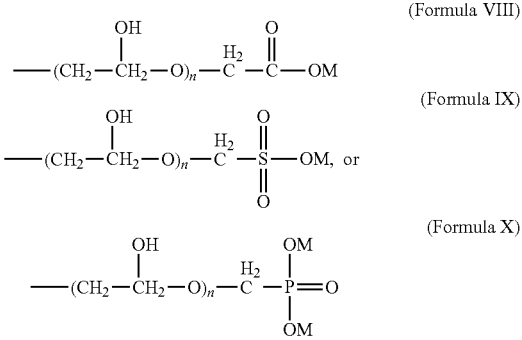

wherein each n is independently 1 to 30, 1 to 20, or 1 to 10; and each M is independently H or a metal ion such as sodium ions, potassium ions, magnesium ions, barium ions, cesium ions, lithium ions, zinc ions, calcium ions, or aluminum ions.

Various chemical reactions can be used to covalently functionalize the fillers. Exemplary reactions include, but are not limited to, oxidization, reduction, amination, free radical additions, CH insertions, cycloadditions, polymerization via a carbon-carbon double bond, or a combination comprising at least one of the foregoing. In some embodiments, the fillers are covalently functionalized. Covalently functionalized carbon is specifically mentioned. As a specific example, the functionalized filler comprises carbon nanotubes functionalized with a sulfonate group, a carboxylic acid group, or a combination thereof.

In formula (I), x+y=4, x, y are greater than zero. In formulas (II) and (III), x is 1 to 3. In formula (IV), x is 1 or 2.

The filler can be in the particle form or fiber form. In an embodiment, the filler comprises nanoparticles. Nanoparticles are generally particles having an average particle size, in at least one dimension, of less than one micrometer. Particle size, including average, maximum, and minimum particle sizes, may be determined by an appropriate method of sizing particles such as, for example, static or dynamic light scattering (SLS or DLS) using a laser light source. Nanoparticles may include both particles having an average particle size of 250 nm or less, and particles having an average particle size of greater than 250 nm to less than 1 micrometer (sometimes referred in the art as "sub-micron sized" particles). In an embodiment, a nanoparticle may have an average particle size of about 1 to about 500 nanometers (nm), specifically 2 to 250 nm, more specifically about 5 to about 150 nm, more specifically about 10 to about 125 nm, and still more specifically about 15 to about 75 nm.

Figure 2:
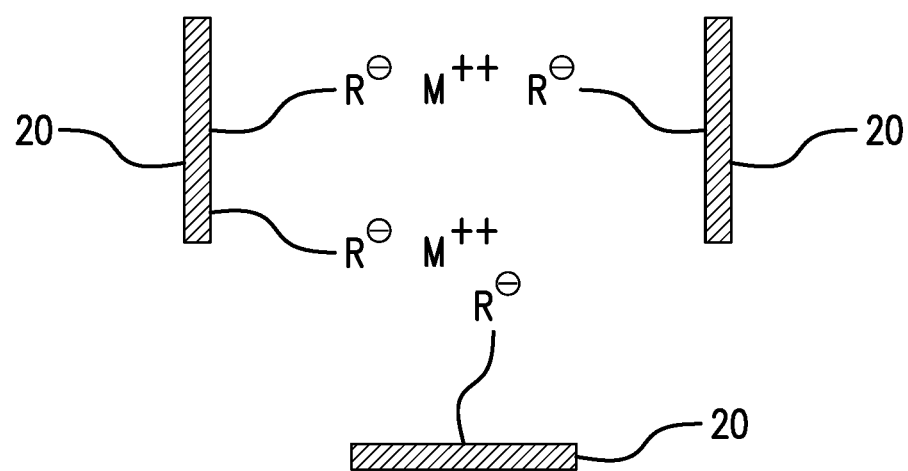
FIG. 2 illustrates the crosslinking between functionalized carbon in a cementing composition according to an embodiment of the disclosure.

In an embodiment, the functionalized carbon includes fluorinated, sulfonated, phosphonated, or carboxylated carbon nanotubes. These functionalized carbon nanotubes could covalently link to the metal cations of in the cementitious material or in the hydrated cementitious material in a similar way as ionomers do. Exemplary metal cations include calcium ions, aluminum ions, zinc ions, magnesium ions, barium ions, or a combination comprising at least one of the foregoing. FIG. 2 illustrates the crosslinking of two functionalized carbon nanotubes in the cementing composition. As shown in FIG. 2, carbon nanotubes 20 are crosslinked via the interaction between the ionic groups R on the carbon nanotubes and the metal cation present in the component.

In an embodiment, the ductility modifying agent comprises both the functionalized filler and the ionomer. In a specific embodiment, the ductility modifying agent comprises both the functionalized carbon nanotubes and ionomers. The component can comprise crosslinks between ionomers, crosslinks between functionalized fillers, crosslinks between ionomers and functionalized fillers, or a combination comprising at least one of the foregoing. In an embodiment, the ionomer, the functionalized filler, or both the ionomer and the functionalized filler are crosslinked with a metal ion in the component. Exemplary metal ions include the ions of magnesium, calcium, strontium, barium, radium, zinc, cadmium, aluminum, gallium, indium, thallium, titanium, zirconium, or a combination comprising at least one of the foregoing. Preferably the metal ions include the ions of one or more of the following metals: magnesium, calcium, barium, zinc, aluminum, titanium, or zirconium. The metal ions can be part of the cementitious material or the hydrated cementitious material or other components such as fly ash particles as well as by incorporation salts of cations capable of crosslinking ionomers with ionomers, crosslinking functionalized fillers with functionalized fillers, or crosslinking ionomers with functionalized fillers, or a combination thereof.

Figure 3:
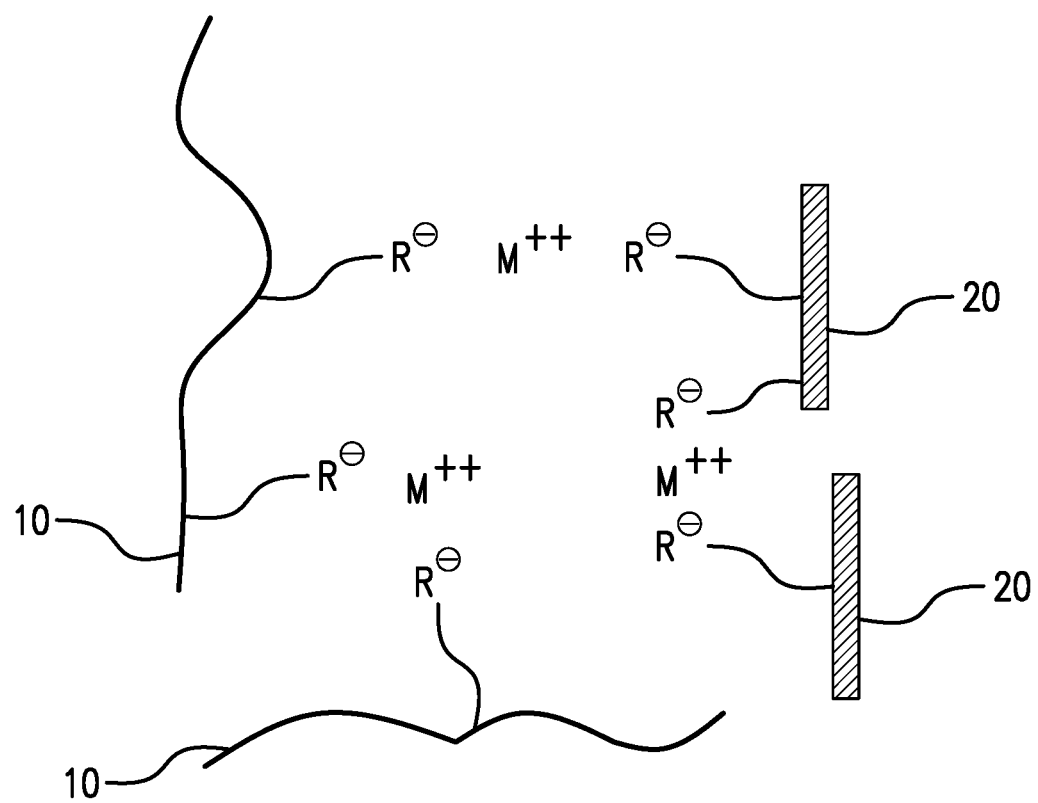
FIG. 3 illustrates the crosslinking between an ionomer and functionalized carbon in an exemplary cementing composition.

FIG. 3 illustrates the crosslinking of the ionomers and functionalized carbon in a component. As shown in FIG. 3, a polymer chain 10 can be crosslinked with another polymer chain 10 or crosslinked with a functionalized filler 20. Similarly, functionalized filler 20 can be crosslinked with another functionalized filler 20 or a polymer chain 10. Without wishing to be bound by theory, it is believed the cementing composition can have both improved ductility and improved strength when the composition contains both an ionomer and functionalized filler.

Functionalized filler, when present in the components, can be stabilized with a stabilizing agent comprising a surfactant, surface-active particles, or a combination comprising at least one of the foregoing. The stabilizing agent stabilizes the functionalized filler, in particular functionalized carbon in an aqueous carrier as a stabilized dispersion, which can be used to prepare the components. The stabilizing agent can be present in an amount of about 0.1 to 10 wt. % or 0.1 to 5 wt. % based on the weight of the components.

Exemplary surfactants include sodium dodecylbenzenesulfonate (SDBS); sodium dodecyl sulfate (SDS); poly (amidoamine) dendrimers (PAMAM dendrimers); polyvinylpyrrolidone (PVP), naphthalenesulfonic acid, polymer with formaldehyde, sodium salt, and cetyl(triethyl)ammonium bromide (CTAB).

Surface-active particles include Janus particles and non-Janus nanoparticles. The example of Janus particles that can be used to stabilize filler in an aqueous carrier is the Janus graphene oxide (GO) nanosheets with their single surface functionalized by alkylamine. The functionalization method is described in details in Carbon, Volume 93, November 2015, Pages 473-483. Non-Janus nanoparticles that may stabilize filler in aqueous solution are hydrous zirconia nanoparticles. Without wishing to be bound by any theory, it is believed that highly charged zirconia nanoparticles segregate to regions near negligibly charged larger filler particles such as carbon particles because of their repulsive Coulombic interactions in solution and stabilize them in the aqueous dispersion.

The metallic fiber comprises steel fiber or iron fiber. The polymeric fiber comprises one or more of the following: polyvinyl alcohol fiber; polyethylene fiber; polypropylene fiber; polyethylene glycol fiber; or poly(ethylene glycol)-poly(ester-carbonate) fiber. Polyvinyl alcohol fibers are specifically mentioned. The fibers can have a length of about 0.5 mm to about 20 mm or about 0.5 mm to about 3 mm, and a diameter of about 20 microns to about 200 microns or about 30 microns to about 60 microns.

The ductility modifying agent can be present in the components in an amount of about 0.1 to about 20 wt. %, based on the total weight of the components, preferably about 1 to about 10 wt. %, based on the total weight of the components. In an embodiment, the components comprise about 0.1 to about 8 or about 0.5 to about 3 wt. % of a metal fiber, based on the total weight of the components. When the ductility modifying agent comprises the polymer fiber, the ductility modifying agent can be present in an amount of about 0.1 to about 10 wt. % or about 0.5 to about 5 wt. %, based on the total weight of the components. In an embodiment, the components comprise about 0.1 to about 10 wt. % or about 0.5 to about 5 wt. % of an ionomer, based on the total weight of the components. In an embodiment, the components comprise about 0.1 to about 10 wt. % or about 1 to about 5 wt. % of functionalized carbon, based on the total weight of the components. In yet another embodiment, the components comprise about 0.1 to about 10 wt. % or about 1 to about 5 wt. % of a functionalized carbon and about 0.1 to about 5 wt. % of the ionomer, each based on the total weight of the components.

The component further comprises a cementitious material. The cementitious material can be any material that sets and hardens by reaction with water. Suitable cementitious materials, including mortars and concretes, can be those typically employed in a wellbore environment, for example those comprising calcium, magnesium, barium, aluminum, silicon, oxygen, and/or sulfur. Such cementitious materials include, but are not limited to, Portland cements, pozzolan cements, gypsum cements, high alumina content cements, silica cements, and high alkalinity cements, or combinations of these. Portland cements are particularly useful. In some embodiments, the Portland cements that are suited for use are classified as Class A, B, C, G, and H cements according to American Petroleum Institute, API Specification for Materials and Testing for Well Cements, and ASTM Portland cements classified as Type I, II, III, IV, and V.

The cementitious material can be present in the components in an amount of about 5 wt. % to about 60 wt. % based on the total weight of the components, preferably about 15 to about 50 wt. % of the weight of the components, more preferably about 20 to about 50 wt. %, based on the total weight of the components.

The component can contain aggregate. The term "aggregate" is used broadly to refer to a number of different types of both coarse and fine particulate material, including, but are not limited to, sand, gravel, slag, recycled concrete, silica, glass spheres, limestone, feldspar, and crushed stone such as chert, quartzite, and granite. The fine aggregates are materials that almost entirely pass through a Number 4 sieve (ASTM C 125 and ASTM C 33). The coarse aggregate are materials that are predominantly retained on a Number 4 sieve (ASTM C 125 and ASTM C 33). In an embodiment, the aggregate comprises sand such as sand grains. The sand grains can have a size from about 1 μm to about 2000 μm, specifically about 10 μm to about 1000 μm, and more specifically about 10 μm to about 500 μm. As used herein, the size of a sand grain refers the largest dimension of the grain. Aggregate can be present in an amount of about 10% to about 95% by weight of the component, about 10% to about 85% by weight of the component, about 10% to about 70% by weight of the cementing composition, about 20% to about 80% by weight of the cementing composition, about 20% to about 70% by weight of the component, 20% to about 60% by weight of the component, about 20% to about 40% by weight of the component, 40% to about 90% by weight of the component, 50% to about 90% by weight of the component, 50% to about 80% by weight of the component, or 50% to about 70% by weight of the component.

The components further comprise an aqueous carrier fluid. The aqueous carrier fluid is present in the components in an amount of about 0.1% to about 30% by weight, specifically in an amount of about 0.5% to about 25% by weight, more specifically about 0.5 to about 20 wt. %, each based on the total weight of the components. The aqueous carrier fluid can be fresh water, brine (including seawater), an aqueous base, or a combination comprising at least one of the foregoing. It will be appreciated that other polar liquids such as alcohols and glycols, alone or together with water, can be used in the carrier fluid. In an embodiment, the components comprise water in an amount of about 0.1% to about 30% by weight, specifically in an amount of about 0.5% to about 25% by weight, more specifically about 0.5% to about 20% by weight, each based on the total weight of the components.

The components can further comprise various additives. Exemplary additives include a high range water reducer or a superplasticizer; a reinforcing agent, a self-healing additive, a fluid loss control agent, a weighting agent to increase density, an extender to lower density, a foaming agent to reduce density, a dispersant to reduce viscosity, a thixotropic agent, a bridging agent or lost circulation material, a clay stabilizer, or a combination comprising at least one of the foregoing. These additive components are selected to avoid imparting unfavorable characteristics to the components, and to avoid damaging the wellbore or subterranean formation. Each additive can be present in amounts known generally to those of skill in the art.

Weighting agents are high-specific gravity and finely divided solid materials used to increase density, for example silica flour, fly ash, calcium carbonate, barite, hematite, ilemite, siderite, wollastonite, hydroxyapatite, fluorapatite, chlorapatite and the like. In some embodiments, about 20 wt. % to about 50 wt. % of wollastonite is present in the components, based on the total weight of the components. Hollow nano- and microspheres of ceramic materials such as alumina, zirconia, titanium dioxide, boron nitride, and carbon nitride can also be used as density reducers.

High range water reducers or superplasticizers can be grouped under four major types, namely, sulfonated naphthalene formaldehyde condensed, sulfonated melamine formaldehyde condensed, modified lignosulfonates, and other types such as polyacrylates, polystyrene sulfonates.

Reinforcing agents include fibers such as metal fibers and carbon fibers, silica flour, and fumed silica. The reinforcing agents act to strengthen the set material formed from the cementing compositions.

Self-healing additives include swellable elastomers, encapsulated cement particles, and a combination comprising at least one of the foregoing. Self-healing additives are known and have been described, for example, in U.S. Pat. Nos. 7,036,586 and 8,592,353.

Exemplary components are provided. In an embodiment, the components comprise about 15 wt. % to about 50 wt. % of a cementitious material such as Portland cement, about 20 wt. % to about 60 wt. % of an aggregate such as sand; about 0.5 to about 12 wt. % of an ionomer, more specifically about 1 wt. % to about 5 wt. % of an ionomer, and about 0.5 wt. % to about 12 wt. % functionalized filler, more specifically about 2 wt. % to about 8 wt. % of functionalized filler such as functionalized carbon nanotubes, each based on the total weight of the components. The components can also contain about 0.5 wt. % to about 25 wt. % or about 0.5 wt. % to about 20 wt. % of water, based on the total weight of the components. Additional additives as disclosed herein can also be included in the components.

In another embodiment, the components comprise about 15 wt. % to about 50 wt. % of a cementitious material such as Portland cement, about 20 wt. % to about 60 wt. % of an aggregate such as sand; and about 0.1 to about 8 wt. % or about 0.5 wt. % to about 3 wt. % of metallic fibers such as steel fibers, each based on the total weight of the components. The components can also contain about 0.5 wt. % to about 25 wt. % or about 0.5 wt. % to about 20 wt. % of water, based on the total weight of the components. Additional additives as disclosed herein can also be included in the components.

In still another embodiment, the components comprise about 15 wt. % to about 50 wt. % of a cementitious material such as Portland cement, about 20 wt. % to about 60 wt. % of an aggregate such as sand; and about 1 wt. % to about 10 wt. % or about 1 wt. % to about 5 wt. % of polymeric fibers, each based on the total weight of the components. The components can also contain about 0.5 wt. % to about 25 wt. % or about 0.5 wt. % to about 20 wt. % of water, based on the total weight of the components. Additional additives as disclosed herein can also be included in the components.

As a specific example, the components comprise about 25 wt. % to about 30 wt. % of a cementitious material such as Portland cement, about 35 wt. % to about 45 wt. % of aggregate such as sand; about 5 wt. % to about 15 wt. % of silica fume; about 5 wt. % to about 10 wt. % of ground quartz, about 0.5 wt. % to about 3 wt. % of a high range water reducer; about 0.5 wt. % to about 3 wt. % of an accelerator; and about 2 wt. % to about 10 wt. % of metal fibers such as steel fibers, each based on the total weight of the components.

As another specific example, the components comprise about 25 to about 40 wt. % of a cementitious material such as Portland cement, about 5 wt. % to about 12 wt. % of silica fume, about 5 wt. % to about 15 wt. % of quartz powder, about 30 wt. % to about 45 wt. % of sand, 0.5 wt. % to about 7 wt. % of metal fibers, and about 0.1 wt. % to about 5 wt. % of a superplasticizer, each based on the total weight of the components.

By decreasing the size of the cement components, such as sand, cement, and filler particles size, and fiber diameters, greater synergy of properties can be achieved due to increased interfacial area between components, leading to improved ductility and higher strength. In some embodiments, all the solid particles in the components have a particle size of less than about 100 microns or less than about 20 microns. The diameters of the fibers are less than about 100 microns or less than about 20 microns.

The ingredients of the components can be mixed together in the presence of a carrier and then molded or casted forming the component. The carrier can be an aqueous carrier fluid and is used in an amount of about 1% to about 60% by weight, more specifically in an amount of about 1% to about 40% by weight, based on the total weight of the compositions to form the components.

If necessary, the molded or casted component can be further heat treated at a temperature of 150° F. to about 1,000° F. and a pressure of about 100 psi to about 10,000 psi for about 30 minutes to about one week. Without wishing to be bound by theory, it is believed that the heat treatment can strength the components at a microscopic level.

The components have a compressive strength of about 5 ksi to about 150 ksi, specifically about 20 ksi to about 60 ksi. The components can be a frustoconical member or a bottom sub for a downhole tool. In another embodiment, combinations of the components are used together for the downhole tool to control fluid flow.

Exemplary components include casing; liner; casing shoe; mandrels of packers, plugs, sandscreens; and centralizers.

Figure 4:
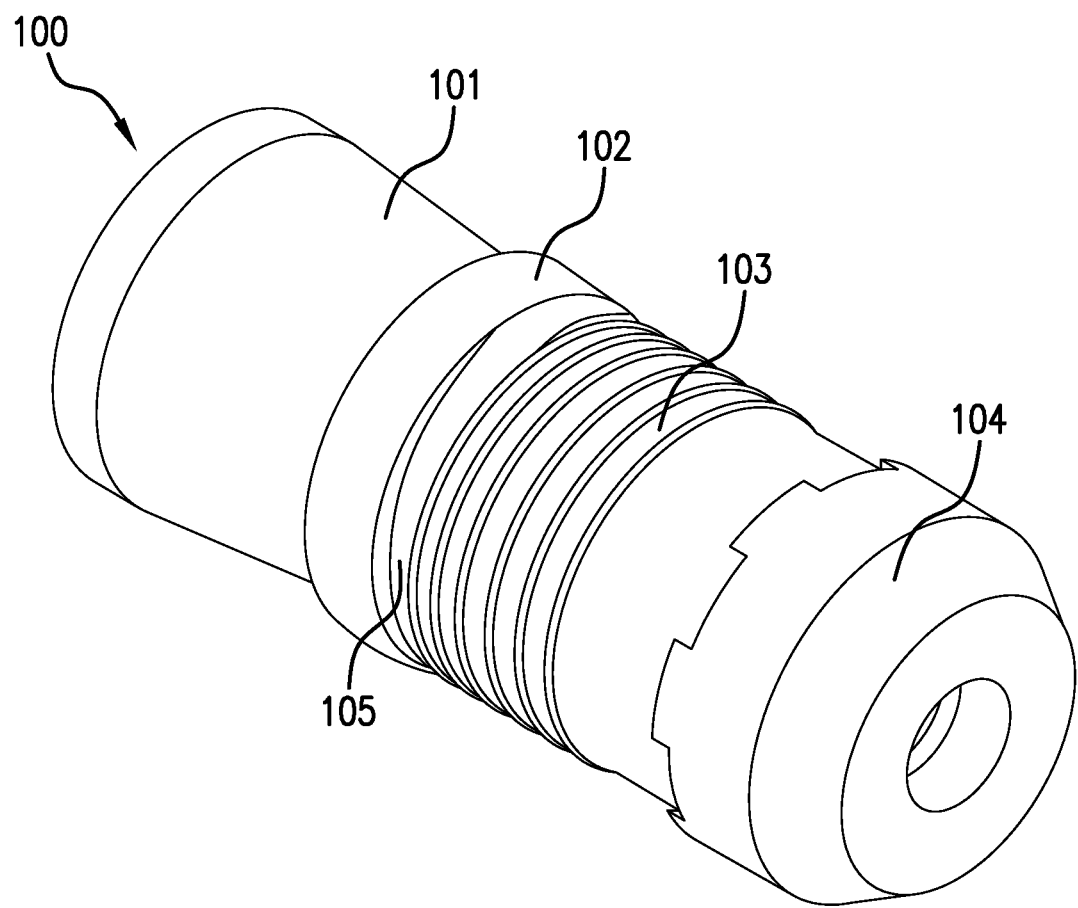
FIG. 4 illustrates an exemplary embodiment of a downhole tool that is effective to control fluid flow.

An embodiment of a downhole tool that controls fluid flow is show in FIG. 4. Referring to FIG. 4, a downhole 100 includes a frustoconical member 101 (also referred to as a cone). A bottom sub 104 is disposed at an end of the tool. A seal member 102 is radially expandable in response to being moved longitudinally against the frustoconical member. One way of moving the seal member 102 relative to the frustoconical member 101 is to compress longitudinally the complete assembly with a setting tool. (not shown) The tool 100 can also include a slip segment 103 and an abutment member 105 intermediate of the seal member 102 and the slip segment 103. The frustoconical member 101, the seal member 102, the slip segment 103, the abutment member 105, and the bottom sub 104 can all be disposed about an annular body (not shown), which is a tubing, mandrel, or the like.

The frustoconical member 101 includes a first end and a second end, wherein the first end is configured for engagement with the seal member 102. Optionally the downhole tool also includes a second slip segment (not shown), which is configured for contact with the frustoconical member 101. In an embodiment, the second slip is moved into engagement or compression with the second end of the frustoconical member 101 during setting.

The seal member 102 is configured (e.g., shaped) to accept the frustoconical member 101 to provide force on the seal member 102 in order to deform the seal member 102 to form a seal with mating surfaces. Illustratively a compressive force is applied to the seal member 102 by a frustoconical member 101 and a setting tool disposed at opposing ends of the seal member (not shown). To achieve the sealing properties, the seal member has a percent elongation of about 10% to about 500%, specifically about 15% to about 200%, and more specifically about 15% to about 50%, based on the original size of the seal member.

The abutment member 105 prevents the extrusion of the seal member. In an embodiment, the abutment member is a backup ring.

The slip segment 103 comprises a slip body; an outer surface comprising gripping elements; and an inner surface configured for receiving an annular body. In an embodiment, the slip segment can be made of cast iron. The slip segment is configured to be radically altered to engage a structure to be isolated. In an embodiment, the slip segment has at least one surface that is radially alterable in response to longitudinal movement of the frustoconical member relative to the slip segment. The at least one surface being engageable with a wall of a structure positioned radially thereof to maintain position of at least the slip segment thus the downhole tool relative to the structure when engaged therewith.

In an embodiment, the bottom sub 104 is the terminus of a downhole tool (e.g., tool 100). In another embodiment, the bottom sub 104 is disposed at an end of a string. In certain embodiment, the bottom sub 104 is used to attach tools to a string. Alternatively, the bottom sub 104 can be used between tools or strings and can be part of a joint or coupling. In a non-limiting embodiment, a first end of the bottom sub 104 provides an interface with, e.g., the slip segment 103, and a second end of the bottom sub 104 engages a setting tool.

The downhole tool is configured to set (i.e., anchor) and seal to a structure such as a liner, casing, or closed or open hole in an earth formation borehole, for example, as is employable in hydrocarbon recovery and carbon dioxide sequestration applications.

During setting, tool 100 is configured such that longitudinal movement of the frustoconical member 101 relative to the seal member 102 causes the seal 102 to expand radially into sealing engagement with a structure. In addition, a pressure applied to the tool urges the seal member 102 toward the slip segment 103 to thereby increase both sealing engagement of the seal member 102 with the structure to be separated and the frustoconical member 101 as well as increasing the anchoring engagement of the slip segment 104 with the structure.

Set forth below are various embodiments of the disclosure.

Embodiment 1. A component for a downhole tool comprising: a cementitious material; an aggregate; and a ductility modifying agent comprising one or more of the following: an ionomer; a functionalized filler; the functionalized filler comprising one or more of the following: functionalized carbon; functionalized clay; functionalized silica; functionalized alumina; functionalized zirconia; functionalized titanium dioxide; functionalized silsesquioxane; functionalized halloysite; or functionalized boron nitride; a metallic fiber; or a polymeric fiber.

Embodiment 2. The component of Embodiment 1, wherein the component is a frustoconical member, a bottom sub, or a combination thereof.

Embodiment 3. A downhole tool for controlling the flow of a fluid in a wellbore, the downhole tool including a component that comprises: a cementitious material; an aggregate; and a ductility modifying agent comprising one or more of the following: an ionomer; a functionalized filler; the functionalized filler comprising one or more of the following: functionalized carbon; functionalized clay; functionalized silica; functionalized alumina; functionalized zirconia; functionalized titanium dioxide; functionalized silsesquioxane; functionalized halloysite; or functionalized boron nitride; a metallic fiber; or a polymeric fiber.

Embodiment 4. The downhole tool of Embodiment 3, wherein the ionomer, the functionalized filler, or both the ionomer and the functionalized filler are crosslinked with a metal ion in the component.

Embodiment 5. The downhole tool of Embodiment 4, wherein the metal ion comprises one or more of the following: magnesium ions; calcium ions; strontium ions; barium ions; radium ions; zinc ions; cadmium ions; aluminum ions; gallium ions; indium ions; thallium ions; titanium ions; or zirconium ions.

Embodiment 6. The component or downhole tool of any one of Embodiments 1 to 3, wherein the metallic fiber comprises steel fiber or iron fiber.

Embodiment 7. The component or downhole tool of any one of Embodiments 1 to 3, wherein the polymeric fiber comprises one or more of the following: polyvinyl alcohol fiber; polyethylene fiber; polypropylene fiber; polyethylene glycol fibers; or poly(ethylene glycol)-poly(ester-carbonate) fibers.

Embodiment 8. The component or downhole tool of any one of Embodiments 1 to 7, wherein the ionomer comprises a polymer backbone formed from one or more of the following monomers: an acid anhydride based monomer; an ethylenically unsaturated sulfonic acid; an ethylenically unsaturated phosphoric acid; an ethylenically unsaturated carboxylic acid; a monoester of an ethylenically unsaturated dicarboxylic acid; ethylene; propylene; butylene; butadiene; styrene; vinyl acetate; or (meth)acrylate; and wherein the ionomer comprises one or more of the following functional groups: a sulfonate group, a phosphonate group, a carboxylate group, a carboxyl group, a sulfonic acid group, or a phosphonic acid group.

Embodiment 9. The component or downhole tool of any one of Embodiments 1 to 4, wherein the ductility modifying agent comprises both the functionalized filler and the ionomer.

Embodiment 10. The component or downhole tool of any one of Embodiments 1 to 9, wherein the functionalized filler has one or more of the following functional groups: a sulfonate group, a phosphonate group, a carboxylate group, a carboxyl group, a sulfonic acid group, or a phosphonic acid group.

Embodiment 11. The component or downhole tool of any one of Embodiments 1 to 10, wherein the cementitious material comprises one or more of the following: Portland cement; pozzolan cement; gypsum cement; high alumina content cement; silica cement; or high alkalinity cement.

Embodiment 12. The component or downhole tool of any one of Embodiments 1 to 11, wherein the component further comprises one or more of the following: wollastonite; silica flour; fly ash; calcium carbonate; barite; hematite; ilemite; siderite; hydroxyapatite; fluorapatite; or chlorapatite.

Embodiment 13. The component or downhole tool of any one of Embodiments 1 to 12, wherein the component comprises about 0.1 wt. % to about 10 wt. % of the ductility modifying agent based on the total weight of the component.

Embodiment 14. The component or downhole tool of any one of Embodiments 1 to 13, wherein the component comprises: about 0.5 to about 12 wt. % of the functionalized filler; about 0.5 to about 12 wt. % of the ionomer; about 15 to about 50 wt. % of the cementitious material; and about 20 to about 60 wt. % of the aggregate, each based on the total weight of the component.

Embodiment 15. The component or downhole tool of any one of Embodiments 1 to 13, wherein the component comprises: about 0.1 to about 8 wt. % of the metallic fiber; about 15 to about 50 wt. % of the cementitious material; and about 20 to about 60 wt. % of the aggregate, each based on the total weight of the component.

Embodiment 16. The component or downhole tool of any one of Embodiments 1 to 13, wherein the component comprises: about 1 to about 10 wt. % of the polymeric fiber; about 15 to about 50 wt. % of the cementitious material; and about 20 to about 60 wt. % of the aggregate, each based on the total weight of the component.

Embodiment 17. The downhole tool of any one of Embodiments 3 to 16, further comprising a seal member adjacent the component.

Embodiment 18. The downhole tool of any one of Embodiments 3 to 17, wherein the downhole tool is a frac plug or a bridge plug.

Embodiment 19. A downhole tool for controlling the flow of a fluid in a wellbore, the tool comprising: an annular body having a flow passage therethrough; a frustoconical member disposed about the annular body; a seal member carried on the annular body and configured to engage a portion of the frustoconical member; and a bottom sub disposed about the annular body; wherein at least one of the frustoconical member and the bottom sub comprise: a cementitious material; an aggregate; and a ductility modifying agent comprising one or more of the following: an ionomer; a functionalized filler; the functionalized filler comprising one or more of the following: functionalized carbon; functionalized clay; functionalized silica; functionalized alumina; functionalized zirconia; functionalized titanium dioxide; functionalized silsesquioxane; functionalized halloysite; or functionalized boron nitride; a metallic fiber; or a polymeric fiber.

Embodiment 20. The downhole tool of Embodiment 19, further comprises a slip segment disposed about the annular body intermediate of the seal member and the bottom sub.

Embodiment 21. The downhole tool of Embodiment 19 or Embodiment 20, further comprising a abutment member adjacent the seal member.

Embodiment 22. The downhole tool of any one of Embodiments 19 to 21, wherein at least one of the frustoconical member and the bottom sub comprise, based on the total weight of the frustoconical member or the bottom sub: about 0.5 to about 12 wt. % of the functionalized filler; about 0.5 to about 12 wt. % of the ionomer; about 15 to about 50 wt. % of the cementitious material; and about 20 to about 60 wt. % of the aggregate.

Embodiment 23. The downhole tool of any one of Embodiments 19 to 21, wherein the at least one of the frustoconical member and the bottom sub comprise, based on the total weight of the frustoconical member or the bottom sub: about 0.1 to about 8 wt. % of the metallic fiber; about 15 to about 50 wt. % of the cementitious material; and about 20 to about 60 wt. % of the aggregate.

Embodiment 24. The downhole tool of any one of Embodiments 19 to 21, wherein at least one of the frustoconical member and the bottom sub comprise, based on the total weight of the frustoconical member or the bottom sub: about 1 to about 10 wt. % of the polymeric fiber; about 15 to about 50 wt. % of the cementitious material; and about 20 to about 60 wt. % of the aggregate.

All ranges disclosed herein are inclusive of the endpoints, and the endpoints are independently combinable with each other. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." The modifier "about" used in connection with a quantity is inclusive of the stated value and has the meaning dictated by the context (e.g., it includes the degree of error associated with measurement of the particular quantity).

What is claimed is:

1. A downhole tool for controlling the flow of a fluid in a wellbore, the downhole tool comprising:
   an annular body having a flow passage therethrough;
   a frustoconical member disposed about the annular body;
   a seal member carried on the annular body and configured to engage a portion of the frustoconical member; and
   a bottom sub disposed about the annular body;
   wherein at least one of the frustoconical member or the bottom sub is a component comprising:
   about 15 to about 50 wt. % of a cementitious material;
   about 20 to about 60 wt. % of an aggregate; and
   about 0.1 to about 10 wt. % of a ductility modifying agent comprising an ionomer and a metal fiber; and optionally a functionalized filler, or a polymeric fiber, or a combination thereof, each based on a total weight of the component.

2. The downhole tool of claim 1, wherein the ionomer, the functionalized filler, or both the ionomer and the functionalized filler are crosslinked with a metal ion in the component.

3. The downhole tool of claim 2, wherein the metal ion comprises one or more of the following: magnesium ions; calcium ions; strontium ions; barium ions; radium ions; zinc ions; cadmium ions; aluminum ions; gallium ions; indium ions; thallium ions; titanium ions; or zirconium ions.

4. The downhole tool of claim 1, wherein the metal fiber comprises steel fiber or iron fiber.

5. The downhole tool of claim 1, wherein the ductility modifying agent further comprises the polymeric fiber, and the polymer fiber comprises one or more of the following: polyvinyl alcohol fiber; polyethylene fiber; polypropylene fiber; polyethylene glycol fibers; or polyethylene glycol)-poly(ester-carbonate) fibers.

6. The downhole tool of claim 1, wherein the ionomer comprises a polymer backbone formed from one or more of the following monomers: an acid anhydride based monomer; an ethylenically unsaturated sulfonic acid; an ethylenically unsaturated phosphoric acid; an ethylenically unsaturated carboxylic acid; a monoester of an ethylenically unsaturated dicarboxylic acid; ethylene; propylene; butylene; butadiene; styrene; vinyl acetate; or (meth)acrylate; and wherein the ionomer comprises one or more of the following functional groups: a sulfonate group, a phosphonate group, a carboxylate group, a carboxyl group, a sulfonic acid group, or a phosphonic acid group.

7. The downhole tool of claim 1, wherein the ductility modifying agent further comprises the functionalized filler, and the functionalized filler comprises one or more of the following: functionalized carbon; functionalized clay; functionalized silica; functionalized alumina; functionalized zirconia; functionalized titanium dioxide; functionalized silsesquioxane; functionalized halloysite; or functionalized boron nitride.

8. The downhole tool of claim 7, wherein the functionalized filler has one or more of the following functional groups: a sulfonate group, a phosphonate group, a carboxylate group, a carboxyl group, a sulfonic acid group, or a phosphonic acid group.

9. The downhole tool of claim 1, wherein the cementitious material comprises one or more of the following: Portland cement; pozzolan cement; gypsum cement; high alumina content cement; silica cement; or high alkalinity cement.

10. The downhole tool of claim 1, wherein the component further comprises one or more of the following: wollastonite; silica flour; silica fume; fly ash; calcium carbonate; barite; hematite; ilemite; siderite; hydroxyapatite; fluorapatite; or chlorapatite.

11. The downhole tool of claim 1, wherein the component comprises:
    about 0.1 to about 8 wt. % of the metallic fiber;
    about 15 to about 50 wt. % of the cementitious material; and
    about 20 to about 60 wt % of the aggregate, each based on the total weight of the component.

12. The downhole tool of claim 1, further comprises a slip segment disposed about the annular body intermediate of the seal member and the bottom sub.

13. The downhole tool of claim 1, further comprising a abutment member adjacent the seal member.

14. The downhole tool of claim 1, wherein the component is a frustoconical member.

15. The downhole tool of claim 1, wherein the component is a bottom sub.

16. The downhole tool of claim 1, wherein the downhole tool is a frac plug or a bridge plug.

17. The downhole tool of claim 1, wherein the component comprises about 25 to about 40 wt. % of a cementitious material, about 5 wt. % to about 12 wt. % of silica fume, about 5 wt. % to about 15 wt. % of quartz powder, about 30 wt. % to about 45 wt. % of sand, about 0.5 wt. % to about 7 wt. % of a metal fiber, and about 0.1 wt. % to about 5 wt. % of a superplasticizer, each based on the total weight of the component.

* * * * *